United States Patent
Guimbretiere

[11] Patent Number: 5,338,266
[45] Date of Patent: Aug. 16, 1994

[54] DIFFERENTIAL TRANSMISSION DEVICE AND VISCOUS COUPLER, ESPECIALLY FOR A MOTOR VEHICLE

[75] Inventor: Pierre Guimbretiere, Neauphle le Chateau, France

[73] Assignee: Glaenzer Spicer, Poissy, France

[21] Appl. No.: 872,517

[22] Filed: Apr. 23, 1992

[30] Foreign Application Priority Data

Apr. 26, 1991 [FR] France .................. 91 05201

[51] Int. Cl.⁵ .................................. F16H 1/44
[52] U.S. Cl. .......................... 475/89; 475/232
[58] Field of Search .......... 475/87, 89, 232, 230, 475/231; 192/58 C, 105 B, 35, 57, 58 R, 89 R, 103 R, 52

[56] References Cited

U.S. PATENT DOCUMENTS

| | | | |
|---|---|---|---|
| 3,184,025 | 5/1965 | Aschauer | 192/105 B X |
| 3,762,519 | 10/1973 | Bentley | 192/105 B X |
| 4,031,780 | 6/1977 | Dolan et al. | 475/85 |
| 4,048,872 | 9/1977 | Webb | 475/87 X |
| 4,645,049 | 2/1987 | Matsuda et al. | 192/105 B X |
| 4,683,998 | 8/1987 | Cigdem et al. | 192/58 C |
| 4,690,258 | 9/1987 | Teraoka et al. | 192/58 C |
| 4,757,727 | 7/1988 | Teraoka et al. | 475/87 X |
| 4,825,724 | 5/1989 | Shibuya et al. | 475/232 |
| 4,836,051 | 6/1989 | Guimbretiere | 475/230 X |
| 4,848,506 | 7/1989 | Shimada et al. | 192/58 B |
| 4,874,058 | 10/1989 | Kwoka | 192/58 C X |
| 5,016,742 | 5/1991 | Peier | 192/58 C |
| 5,036,963 | 8/1991 | Murata | 192/52 |
| 5,041,069 | 8/1991 | Horst | 475/231 |
| 5,086,867 | 2/1992 | Hirota et al. | 475/89 X |
| 5,092,825 | 3/1992 | Goscenski, Jr. et al. | 475/231 X |
| 5,133,696 | 7/1992 | Kobayashi | 475/231 X |

FOREIGN PATENT DOCUMENTS

| | | |
|---|---|---|
| 0203570 | 12/1986 | European Pat. Off. . |
| 0314420 | 5/1989 | European Pat. Off. . |
| 3431717 | 10/1985 | Fed. Rep. of Germany . |
| 3836552 | 5/1989 | Fed. Rep. of Germany ...... 475/232 |
| 3830199 | 10/1989 | Fed. Rep. of Germany . |
| 2317558 | 7/1976 | France . |
| 58-152941 | 9/1983 | Japan ................. 192/58 C |
| 2192257 | 1/1988 | United Kingdom . |
| 2212230 | 7/1989 | United Kingdom . |
| 2235502 | 3/1991 | United Kingdom . |

Primary Examiner—Dirk Wright
Attorney, Agent, or Firm—Harness, Dickey & Pierce

[57] ABSTRACT

There is provided a device which incorporates a viscous-fluid coupling (68) and a friction clutch (74) in which are integrated actuation means (80, 81) which cause the engagement or the release of the clutch as a function of the speed of rotation of one of the members which are connected by the device.

14 Claims, 4 Drawing Sheets

DIFFERENTIAL TRANSMISSION DEVICE AND VISCOUS COUPLER, ESPECIALLY FOR A MOTOR VEHICLE

The present invention relates to transmission devices for motor vehicles and especially such devices comprising a viscous-fluid coupling designated in general by the term viscous coupler.

These couplings can be of the type comprising two coaxial elements delimiting a sealed enclosure in which a viscous fluid is housed, each of these elements being rotationally integral with a series of discs, the discs of the two series being alternated and immersed, at least partially, in the viscous fluid. It is known that in such a coupling, the load torque which causes one of the two elements to be driven by the other is a function of the difference in speed between these two elements. These couplings may be used in vehicles, for example in order to control the slip between the two output shafts of a differential, or alternatively be incorporated in a longitudinal transmission in a four-wheel drive vehicle, in which case they may be designated by the term viscous-transmitter.

In certain operational situations, the presence of such couplings can have a drawback. Such is the case especially during a low-speed manoeuvre of the vehicle, for example during a parking manoeuvre, in the course of which it would be preferable not to operate on four-wheel drive.

In other operational conditions, on the contrary, it would be desirable to render rotationally integral the two members between which the coupling device is disposed, above a specified speed of rotation of one of them.

The aim of this invention is consequently to provide a transmission device comprising a differential mechanism, in which means are provided in order to control, in an optimum fashion, the difference in speed between two input and output members of this differential.

For this purpose, the subject of the invention is a transmission device for a vehicle, comprising a differential mechanism fitted with one input member and with two output members, and means for controlling the difference in speed between two of these input and output members, characterised in that the said means comprise, on the one hand, a viscous-fluid coupling device comprising two rotary elements, respectively a driving and a driven element and, on the other hand, a friction clutch together with integrated means in order to actuate the engagement and the release of this clutch as a function of the speed of rotation of one of the two input or output members, the difference in speed of which is controlled.

According to other characteristics:

the friction clutch is disposed in series with the viscous-fluid coupling device;

the friction clutch is disposed in parallel with the viscous-fluid coupling device;

the viscous-fluid coupling device is of the type comprising an inner element and an outer element delimiting between them a sealed enclosure in which the viscous fluid is housed, each of these elements being rotationally integral with a series of discs, the discs of the two series being alternated and immersed, at least partially, in the viscous fluid;

the clutch comprises at least one axially movable plate, which can be actuated by at least one radially movable member through the effect of centrifugal force, against the force exerted by a return spring.

The invention will be described in more detail hereinbelow, with reference to the attached drawings, which are given solely by way of example and in which.

Figure 1:
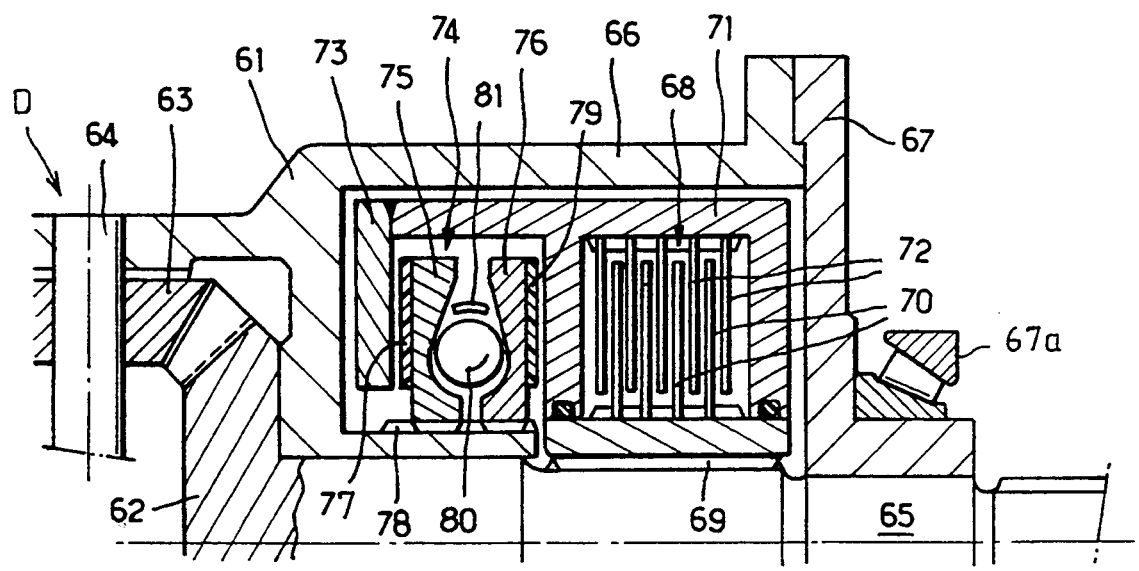
FIGS. 1 to 3 are partial sectional views illustrating various embodiments of the invention.

In the embodiment of FIG. 1, the invention is applied to a differential D which may be a front or rear differential in a vehicle. As a variant, the differential may be an interaxle differential.

This differential comprises a case 61 constituting the input member, sun gears, only one 62 of which is shown in the drawing, and planet gears 63 carried by a planet-gear-carrying spindle 64.

The sun gear 62 is solidly attached to an output shaft 65 which is connected, by any suitable means, to a drive wheel of the vehicle. The other sun gear is rotationally integral with a second output shaft, not shown, which is connected to the other drive wheel.

The case of the differential is extended laterally in order to delimit a casing 66, closed by a cover 67, rotationally supported by a bearing 67a, on the structure of the vehicle.

Inside the enclosure delimited by this extension 66 of the case and by the cover 67 is disposed, according to the invention, an assembly comprising a viscous-fluid coupling 68 whose inner element is a sleeve 69 rotationally integral with the shaft 65 and carrying a first series of discs 70 and whose outer element is a case 71 carrying a second series of discs 72.

The case 71 is extended laterally at 73 in order to constitute a portion of a clutch device 74. This device comprises two clutch plates 75, 76 which are slidably mounted on and rotationally integral with a lateral extension 77 of the differential case 61. These two plates carry friction linings 78, 79 and can be moved apart axially by means of balls 80 which are subjected to centrifugal force and which can move radially outwards against an elastic return member 81.

The operation of such a device is the following: below a certain speed of rotation of the differential case 61, which may be of the order of a few hundred revolutions per minute, the viscous-fluid coupling device 68 plays no part since the clutch 74 is not engaged.

By contrast, beyond such a speed of rotation of the case, the clutch 74 is actuated in the engagement direction and the case 61 of the differential becomes rotationally integral with the case 71 of the viscousfluid coupling. The latter then plays its part and controls the slip of the differential.

In particular, if a wheel slips on starting, the speed of the input member increases, which causes the clutch to engage and the viscous coupler to come into play in order to brake the input member in relation to the shaft 65.

In this embodiment, the coupling 68 and clutch 74 devices, mounted in series, are integrated in the differential.

Figure 2:
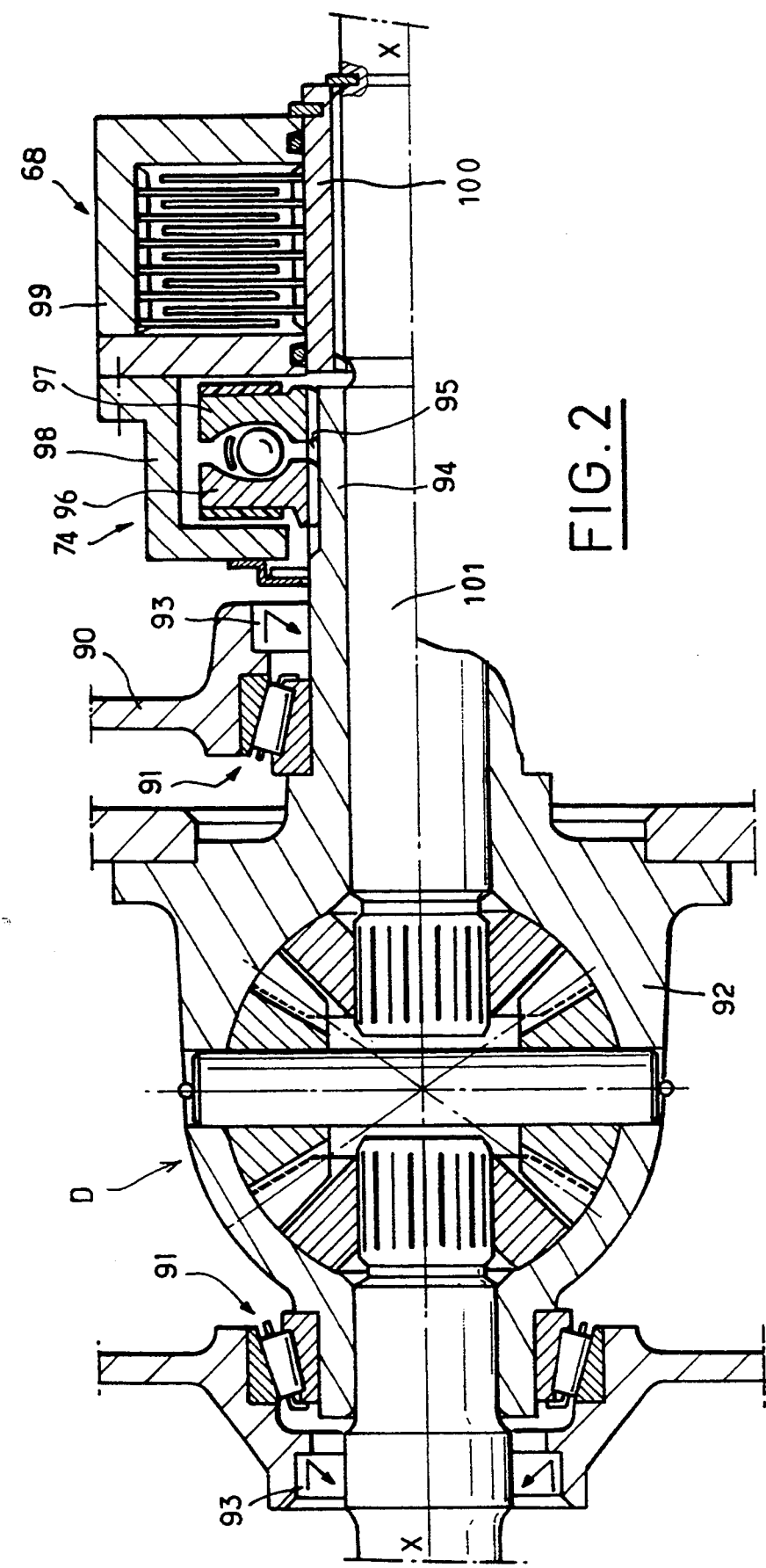

In the embodiment of FIG. 2, these two devices 68, 74 are disposed outside a casing 90 and bearings 91 supporting the differential case 92. For this purpose, the latter is extended, outside the casing 90, the adjacent bearing 91 and a sealing gland 93, by a length of hollow shaft 94 whose splined end 95 supports the plates 96, 97 of the clutch device 74. These plates are disposed inside a case 98 which is itself solidly attached to the adjacent case 99 of the viscous-fluid coupling 68. The internal element 100 of this viscous-fluid coupling is rotationally integral with the adjacent output shaft 101 of the differential, which extends through the hollow extension 94 of the case 92.

The operation of this device is similar to that described with regard to FIG. 1, with the difference that the two clutch and coupling devices are disposed outside the casing of the differential, which leads to improved accessibility and easier fitting.

Figure 3:
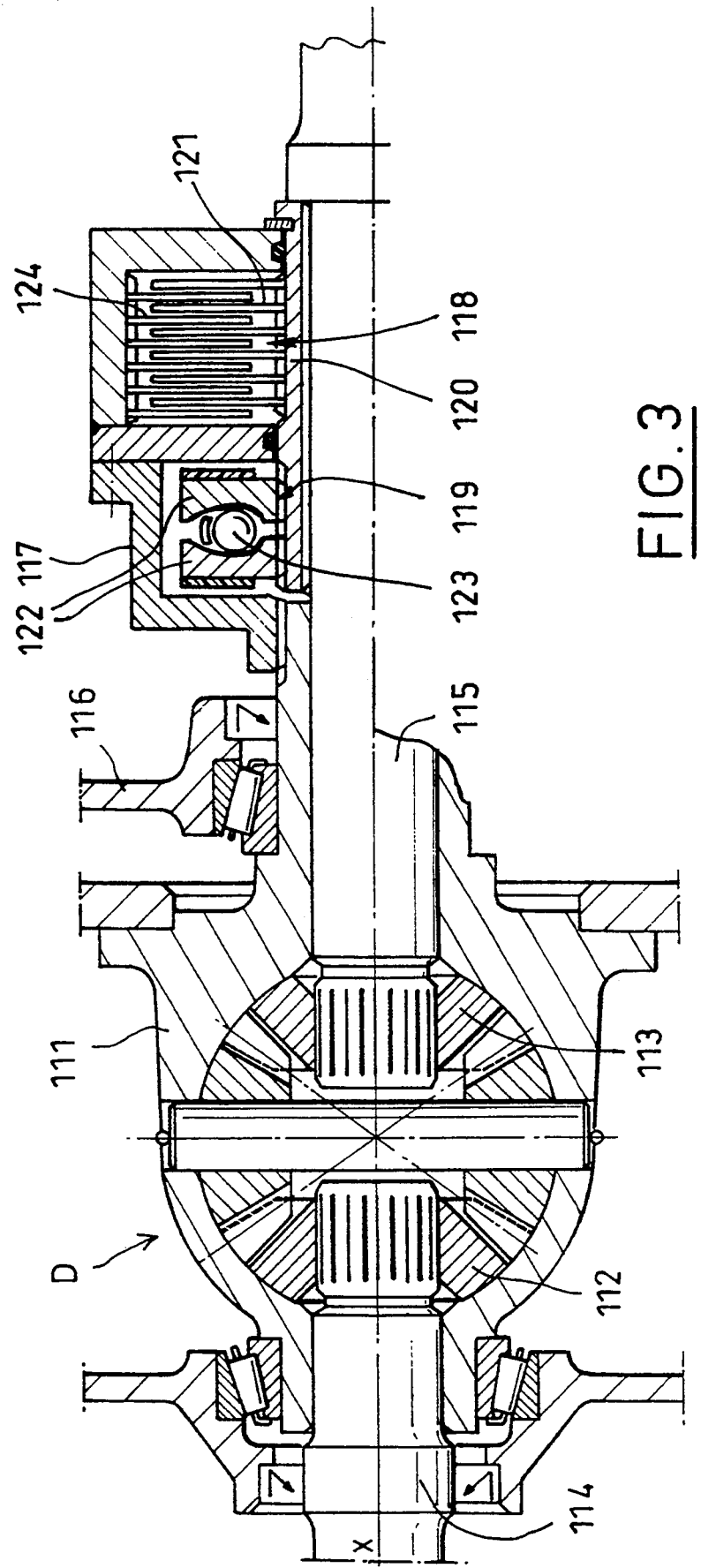

Whereas in the two first embodiments the viscous coupler and the clutch are disposed in series, in the embodiment of FIG. 3, they are disposed in parallel. In this embodiment there are encountered again a differential D comprising a case 111, constituting the input member, and two sun gears 112, 113 connected to output shafts 114, 115. The case 111 is extended outside the casing 107 in order to be connected to a case 117 housing, on the one hand, the viscous coupler 118 and, on the other hand, the clutch 119. A sleeve 120 is connected via internal splines to the output shaft 115 and via external splines, on the one hand, to a series of discs 121 of the viscous coupler and, on the other hand, to two clutch plates 122 between which balls 123 are disposed. The other series of discs 124 of the viscous coupler is rotationally integral with the case 117.

Figure 4:
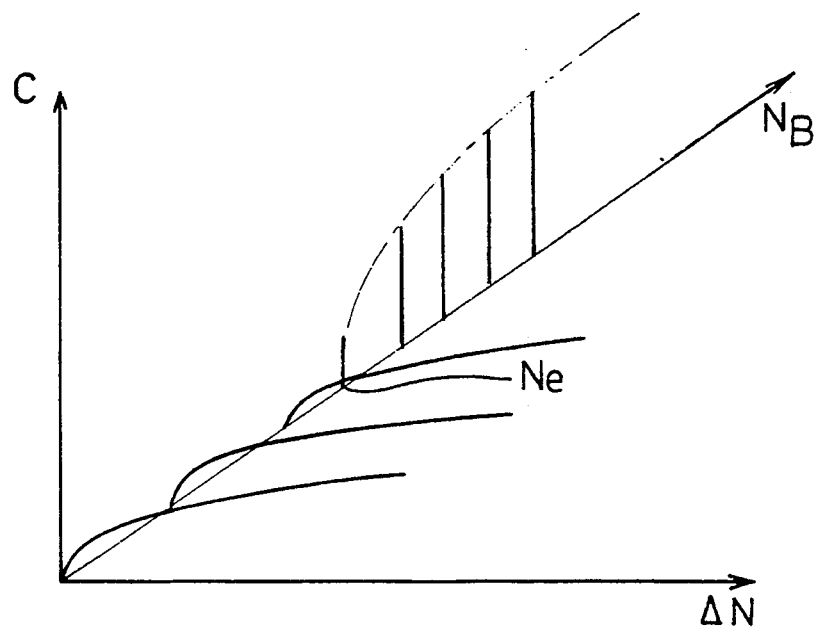
FIG. 4 is a graph illustrating the mode of operation of the device of FIG. 3.

In such a configuration, if the rotation of the case 111 is designated by $N_A$ and the speed of rotation of the output shaft 115 is designated by $N_B$, as long as $N_B$ is less than a specified value $N_e$, the viscous coupler 118 comes into play in order to control the differential speed $\Delta N$ between $N_A$ and $N_B$. The law of variation of the load torque C, as a function of the difference in speed between the input member of the differential and the output member, is shown in FIG. 4 by a series of curves whose starting point moves along the straight line showing the variation in the speed $N_B$ of the output shaft. These curves correspond to the law for operating the viscous coupler, $C=f(\Delta N)$.

As soon as $N_B$ becomes equal to or greater than $N_e$, the clutch is engaged so that $\Delta N$ becomes zero. The law for transmitting the torque then becomes a clutch law, $C=f(N)$, this law being shown in FIG. 4 by a series of segments parallel to the ordinate axis and having as origin points on the straight line showing the variation in the speed $N_B$ of the output shaft.

Figure 5:
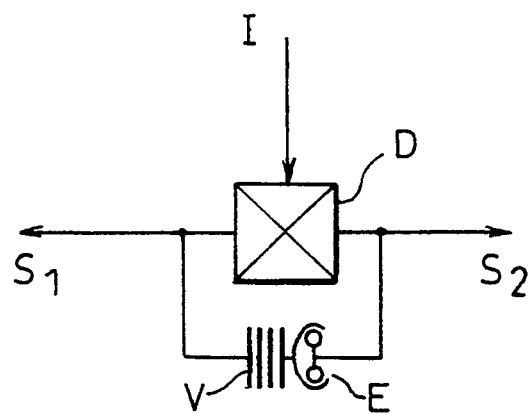
FIGS. 5 and 6 are two diagrams illustrating two other possible configurations of the device according to the invention.
Figure 6:
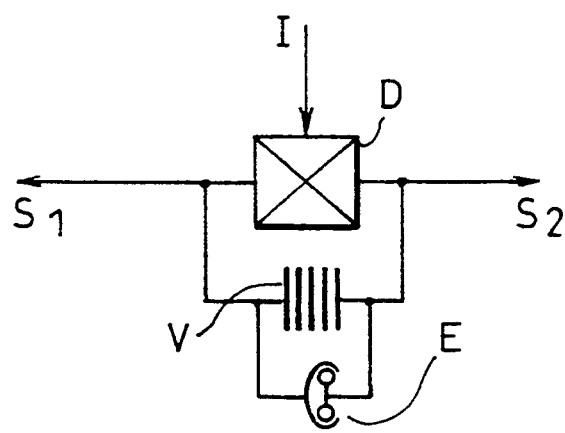

Two other possible configurations implementing the invention have been shown very diagrammatically in FIGS. 5 and 6.

In the case of FIG. 5, a differential D which comprises an input member I and two output members S1, S2 is associated with a viscous coupler V and with a clutch E which are disposed in series between the two output members S1, S2.

In the embodiment of FIG. 6, the viscous coupler V and the clutch E are disposed in parallel, still between the two output members S1, S2.

It will be noted moreover that an additional function may be added to a device according to the invention: the clutch plate closest to the viscous-fluid coupling device may be arranged in such a manner as to modify the operational characteristic of this coupling as a function of the speed of rotation of the shaft carrying the clutch plates. For this purpose, the wall of the case which separates the clutch from the coupling comprises at least one hole in which is housed a shuttle which bears on the clutch plate. Thus, when the balls are moved radially outwards through the effect of centrifugal force, in the first instance the clutch plates move apart, which has the effect of pushing back the shuttle or each shuttle and of modifying the volume of the enclosure of the coupling and, consequently, its internal pressure. This has the effect of modifying the characteristic, $C=f(\Delta N)$, where C is the load torque and $\Delta N$ is the difference in speed of rotation between the two elements of the coupling.

A similar result may be obtained by making the clutch plate act on a movable plate disposed inside the coupling and which has the effect of modifying the distance between the discs.

Finally, two devices according to the invention, comprising a viscous-fluid coupling and a clutch, may be combined in order to replace a conventional differential. It suffices in this case to provide one input member common to the two viscous-fluid couplings and to connect, by any appropriate means, the two output members to the two drive wheels of the vehicle.

I claim:

1. A transmission device for a vehicle comprising:
   a differential mechanism having an input member and a first and second output member; and
   means for controlling the difference in speed between two of said input and said first and second output members, said control means including:
   a viscous-fluid coupling device having an inner element and an outer element defining between them a sealed enclosure containing viscous fluid, each of said inner and outer elements being connected to rotate, respectively, with one of two series of discs, the discs of the two series being alternated and immersed, at least partially, in the viscous fluid;
   a friction clutch associated with and disposed adjacent to said viscous fluid coupling device, said friction clutch having at least one movable member which is permanently connected to rotate with one of said two input and output members, the differential speed of which is controlled, said movable member being actuated to engage with or to be released from one of said inner and outer elements of said viscous fluid coupling device, such that when engaged, said friction clutch transmitting a torque between said one of said two input and output members and said adjacent element of said viscous fluid coupling; and
   centrifugal means for actuating said movable member, said actuating means being integrated into said clutch and responsive to the speed of rotation of said one of said two input and output members, the differential speed of which is controlled.

2. A transmission device for a vehicle comprising:
   a differential mechanism having an input member and a first and second output member; and
   means for controlling the difference in speed between two of said input and said first and second output members, said control means including:
   a viscous-fluid coupling device having an inner element and an outer element defining between them a sealed enclosure containing viscous fluid, each of said inner and outer elements being connected to rotate, respectively, with one of two series of discs, the discs of the two series being alternated and immersed, at least partially, in the viscous fluid;

a friction clutch associated with and disposed adjacent to said viscous fluid coupling device, said friction clutch having at least one movable member which is permanently connected to rotate with one of said two input and output members, the differential speed of which is controlled, said movable member being actuated to engage with or to be released from one of said inner and outer elements of said viscous fluid coupling device, such that when engaged, said friction clutch transmitting a torque between said one of said two input and output members and said adjacent element of said viscous fluid coupling; and centrifugal means for actuating said movable member, said actuating means being integrated into said clutch and responsive to the speed of rotation of said one of said two input and output members, the differential speed of which is controlled.

3. The transmission device according to claim 1, wherein the friction clutch is disposed in parallel with the viscous-fluid coupling device.

4. The transmission device according to claim 1, wherein the clutch is actuated as a function of the speed of the input member of the differential.

5. The transmission device according to claim 1, wherein the clutch is actuated as a function of the speed of the output members of the differential.

6. The transmission device according to claim 1, wherein the clutch defines an axis and comprises:
at least one annular plate movable along said axis;
at least one engagement member movable radially with respect to said axis, said at least one engagement member movable away from said axis through the effect of centrifugal force, and
a return spring urging said at least one engagement member toward said axis.

7. The transmission device according to claim 1, wherein there is provided means, actuated at the same time as the clutch, for varying the operational characteristic of the viscous-fluid coupling device, by modification of the pressure in the enclosure, modification of the distance between the discs device by modification of the pressure in the enclosure or modification of the distance between the discs.

8. The transmission device according to claim 1, wherein the assembly formed by the coupling and the clutch is interposed between a case and one of the output members of the differential mechanism.

9. The transmission device according to claim 8, wherein one of said output members is rotationally integral with the inner element of the coupling device and the clutch is interposed between the case of the differential and the outer element of the coupling device, said clutch being actuated as a function of the speed of rotation of the case.

10. The transmission device according to claim 9, wherein the assembly comprising the viscous-fluid coupling and the clutch is disposed inside the case of the differential.

11. The transmission device according to claim 9, wherein the assembly comprising the viscous-fluid coupling and the clutch is disposed outside the casing containing the differential.

12. The transmission device according to claim 8, wherein one of said output members is rotationally integral with the inner element of the coupling device and with a pair of inner element discs of the coupling device and with a pair of clutch discs of the clutch, the outer element of the coupling device being rotationally integral with the case of the differential.

13. The transmission device according to claim 1, wherein the assembly formed by the coupling and the clutch, which are disposed in series, is interposed between the two output members of the differential.

14. The transmission device according to claim 1, wherein the assembly formed by the coupling device and the clutch, which are disposed in parallel, is interposed between the two output members of the differential.

* * * * *

UNITED STATES PATENT AND TRADEMARK OFFICE
CERTIFICATE OF CORRECTION

PATENT NO. : 5,338,266
DATED : August 16, 1994
INVENTOR(S) : Pierre Guimbretiere It is certified that error appears in the above-identified patent and that said Letters Patent is hereby corrected as shown below:

Column 5, line 27, claim 5, after "speed of", insert --one of--

Signed and Sealed this

Twenty-ninth Day of November, 1994

Attest:

BRUCE LEHMAN

*Attesting Officer*     *Commissioner of Patents and Trademarks*